July 15, 1958
F. K. H. NALLINGER ET AL
2,842,980
GEARSHIFT RESPONSIVE CONTROL ARRANGEMENT
FOR CONTROLLING THE AMOUNT OF INJECTED
FUEL OF AN INTERNAL COMBUSTION ENGINE
Filed Oct. 21, 1954
3 Sheets-Sheet 1
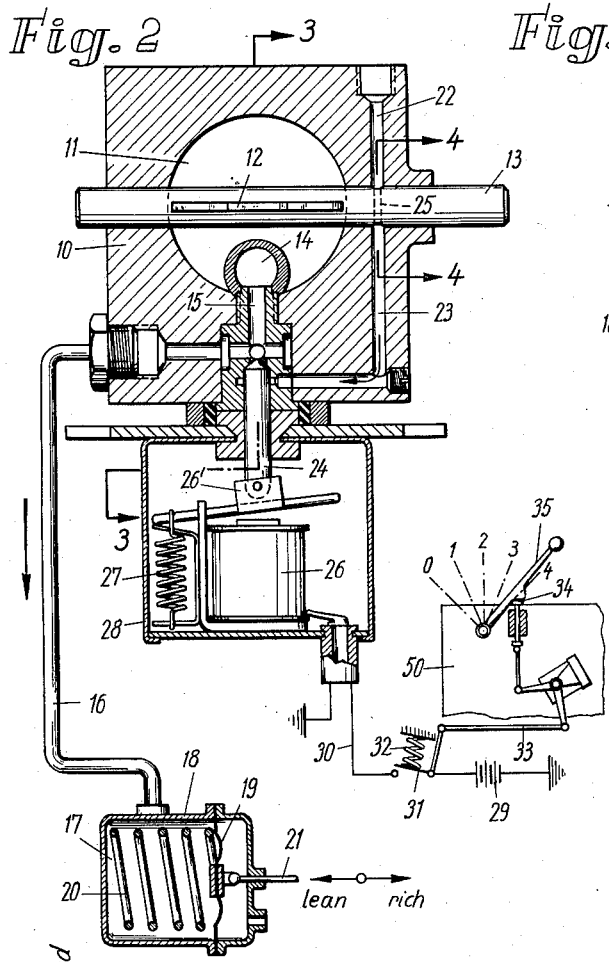
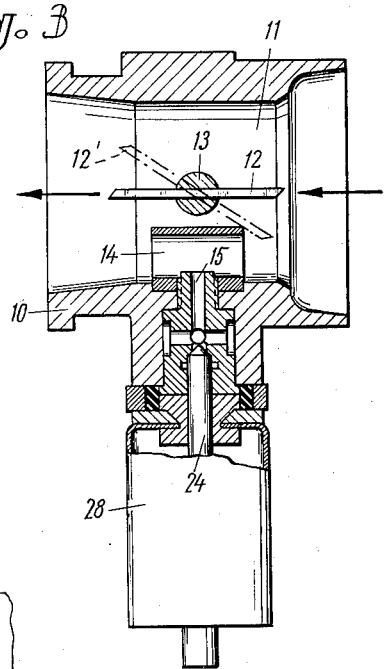
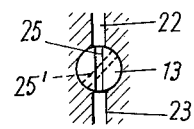
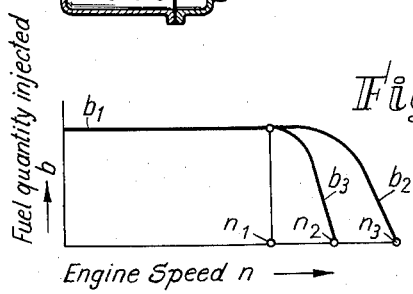
INVENTORS
FRIEDRICH K. H. NALLINGER
RUDOLF UHLENHAUT
RICHARD W. K. SCHUMANN
BY
Dicke and Brig
ATTORNEYS

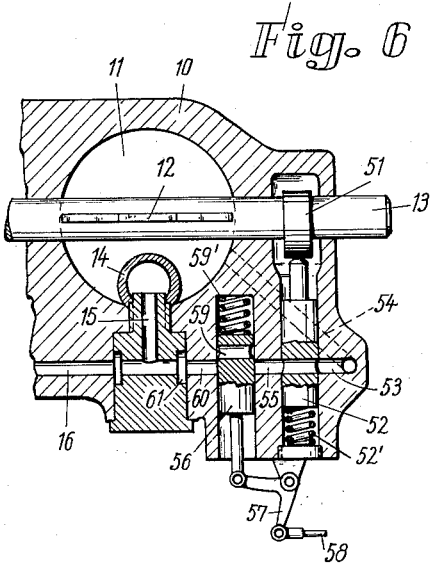
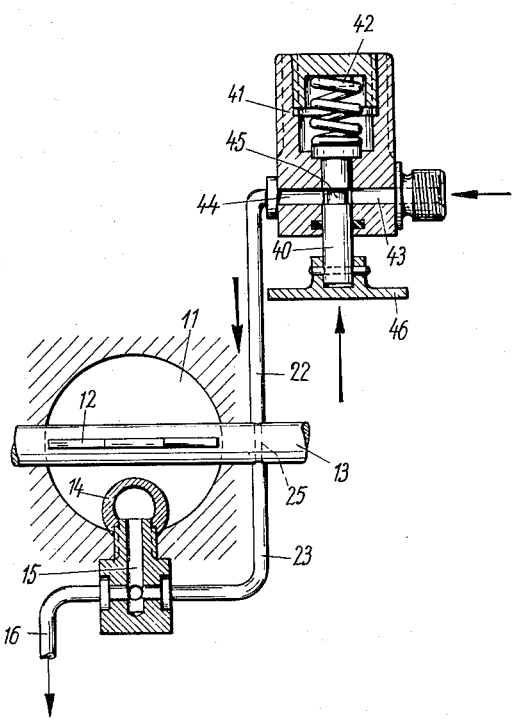
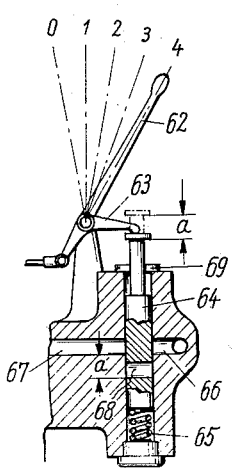
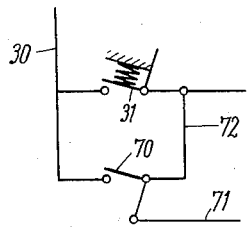
INVENTORS
FRIEDRICH K. H. NALLINGER
RUDOLF UHLENHAUT
RICHARD W. K. SCHUMANN

United States Patent Office 2,842,980
Patented July 15, 1958

2,842,980

GEARSHIFT RESPONSIVE CONTROL ARRANGEMENT FOR CONTROLLING THE AMOUNT OF INJECTED FUEL OF AN INTERNAL COMBUSTION ENGINE

Friedrich K. H. Nallinger and Rudolf E. Uhlenhaut, Stuttgart, and Richard W. K. Schumann, Stuttgart-Unterturkheim, Germany, assignors to Daimler-Benz Aktiengesellschaft, Stuttgart-Unterturkheim, Germany Application October 21, 1954, Serial No. 463,786

10 Claims. (Cl. 74—472)

The present invention relates to improvements in fuel injection engines of the compression type.

The common diesel engine, the speed of which is usually limited by a governor, has the disadvantage of operating only within a limited speed range, a fact which is disagreeably noticeable especially in city traffic requiring quick acceleration of the engine. However, it has been found that a diesel engine is fully capable of withstanding a higher speed than ordinarily permitted by the governor setting, but that such speeds, for example, the maximum speed in the highest gear, increase the fuel consumption to such an extent that the advantages of using this type of engine may no longer be fully realized.

It is one of the objects of the present invention to overcome these disadvantages of the diesel engines previously used by providing means for fully utilizing the efficiency of the engine in the lower gears to obtain an improved and more flexible operation of the engine, an advantage which is especially valuable in city traffic and when attempting to pass other cars.

One of the features of the invention for attaining this object resides in the provision of means for reducing, in one or more of the higher gears, and especially in the highest gear, the fuel quantity injected into the engine and thus the power output thereof, or the maximum speed of the engine relative to the adjustment of the member regulating the fuel quantity or the power output of the engine, or for likewise increasing these values in one or more of the lower gears.

Another object of the invention is to obtain the above features and advantages without any considerable increase of the fuel consumption by limiting the operation of the engine to an economical, reduced speed when engaging the most frequently used gears, especially the highest gear.

Another feature of the invention resides in the provision of a very practical control mechanism for increasing the injected fuel quantity, the power output or the speed of the engine in the lower gears only if the engine output has been adjusted to a maximum or the gears have been shifted to a higher range, but when the partial load region or the lower gear range, as well as the upper gears or the highest gear, remain unaffected so that an excessive speed or racing of the engine within such partial load region will be avoided.

A further feature of the invention resides in the application of an auxiliary force for relatively reducing or increasing the injected fuel quantity or the power output of the engine by conducting such force through two control devices which are connected in series, one of which may be adjusted by the gear shift mechanism and the other by the power control member.

Still another feature of the invention consists in the provision of means whereby, when regulating the engine in accordance with an adjustable underpressure, especially one in the intake line of the engine, the fuel quantity or power output is increased when the underpressure is being reduced through a supply of supplementary air controlled by the gear shift mechanism. According to the invention, such control may be effected directly by the power control member, for example, the shaft of a throttle, and it has the great advantage of being very reliable and simple to operate.

Additional features of the invention reside in means for withdrawing the supplementary air either from the outside or, for example, from the intake pipe, and in providing electromagnetic, mechanical, or any other suitable means for effecting the control responsive to the operation of the gear shift mechanism.

Further objects, features, and advantages of the present invention will appear from the following detailed description and the accompanying drawings, in which Fig. 1 shows a diagram showing the ratio of the speed and quantity of injected fuel of a control mechanism according to the invention;

Fig. 2 shows a cross section through the intake line of a fuel injection engine, with the electric means for controlling the supplementary air supply being shown diagrammatically;

Fig. 3 shows a section taken along line 3—3 of Fig. 2;

Fig. 4 shows a section taken along line 4—4 of Fig. 2;

Fig. 5 shows another embodiment of the invention with a mechanical control of the supplementary air;

Figure 6 shows a sectional view himilar to Figure 2 of a modified embodiment of the control arrangement for the supplementary air conduit;

Figure 7 shows a cross sectional view similar to Figure 5 of still another embodiment of the central arrangement for the supplementary air conduit;

Figure 8 shows a modified embodiment of the electrical control circuit similar to Figure 2;

Figure 9:
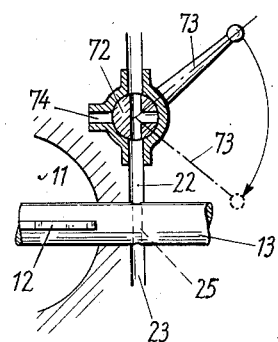
Figure 9 is still a further modified embodiment of the control arrangement of the supplementary air conduit similar to Figure 2.

Referring to the drawings, Fig. 1 shows a diagram in which the engine speed $n$ is plotted along the horizontal line or abscissa and the injected fuel quantity $b$ along the vertical line or ordinate. Under full load up to a speed $n_1$, a uniform quantity $b_1$ is injected into the engine per each revolution thereof in all gears. After exceeding the speed $n_1$, a governor, such as a low-pressure governor, starts to act and reverses the member controlling the fuel injection, so that, if no supplementary air is supplied, a maximum speed of, for example, $n_3$ may be obtained. By supplying supplementary air to the low-pressure chamber of the governor in the lower gears, a proportionate delay occurs in the reduction of the injected quantity of fuel, so that the upper limit of the adjustment, for example, according to the curve $b_2$, will not be reached until a relatively high speed of, for example, $n_2$, has been reached.

However, in the highest gear, for example, the fourth gear, no supplementary air will be supplied in the upper speed range so that, after exceeding the speed $n_1$, the injected fuel quantity may be quickly downwardly adjusted according to curve $b_3$ so as to lie considerably below the speed $n_2$.

In the embodiment of the invention shown in Figs. 2 and 3, the numeral 10 indicates the intake stack of the intake pipe 11, the cross sectional area of which may be varied by a butterfly valve 12 on a valve shaft 13 which may be adjusted, for example, by the hand or foot of the driver. A short pipe section 14 is mounted at right angle to the valve shaft 13 into which an air nozzle 15 terminates which is connected by a line 16 with the low-pressure chamber 17 of a diaphragm control valve 18. The low pressure chamber 17 is closed by a diaphragm 19 which is charged by a spring 20 and adjusts the fuel control member, for example, a control rack of an injection pump or the like, by a connecting rod 21 or a system of such rods.

If by adjusting the valve 12 to a more or less closed position, for example, the position 12', shown in dashed and dotted lines in Figure 3, the underpressure in the intake pipe and thus in the pipe section 14 or the nozzle 15 is increased and the underpressure is transmitted through pipe 16 to the chamber 17, the diaphragm is drawn toward the left against the action of the spring 20, and the rod 21 is adjusted in the direction "lean," whereas at a low underpressure in the intake line 11, the rod 21 is adjusted in the direction "rich."

If, when the butterfly valve 12 is fully open, the speed is increased beyond a certain admissible value, for example $n_1$, the increasing underpressure also acts upon the diaphragm 19 and adjusts the control member for the fuel mixture to "lean."

Further connected to the air nozzle 15 is a channel 22, 23 which is controlled both by a valve 24 and a transverse bore 25 in the valve shaft 13. Valve 24, in turn, is adjusted by an electromagnet 26 through an armature 26' mounted on a two-armed lever and operating against the action of a spring 27. The armature and spring are arranged within a housing 28 and connected with a source of electric current 29 by a conductor 30 which may be opened or closed by a switch 31. Switch 31 may be closed, for example, by a spring 32 and be operated through a system of levers 33 by a stop member 34 which is located within the range of movement of the gear shift lever 35 rotatably supported in the gear transmission housing 50, shown diagrammatically in Fig. 2. Positions 0, 1, 2, 3, and 4 indicate the neutral and individual forward gears of the change-speed gear or transmission 50 operated by the gear shift lever 35. As long as lever 35 is set to one of the lower gears, switch 31 remains closed, the electromagnet 26 is under current, and valve 24 is drawn by electromagnet 26 into the downward position against the action of spring 27. Thus, supplementary air may pass via channel 22 and 23, and pipe 16, to valve chamber 17, so that the underpressure in chamber 17 will be decreased and the quantity of injected fuel be adjusted according to curve $b_2$. This is possible, however, only if the butterfly valve 12 is almost or fully open, so that the channel portions 22 and 23 are connected by the control opening 25 in the valve shaft 13 to admit the supplementary air. If, however, the butterfly valve is more or less closed, the connection between the channel portions 22 and 23 will be broken by the opening 25 in the valve shaft 13 then being in the position 25', so that the supply of supplementary air will be blocked and the partial-load control will not be affected (see Fig. 4). This same effect occurs if the gear shift lever 35 is shifted to the fourth gear, whereby the switch 31 will be opened by means of the stop 34, the magnet 26 thereby being disconnected and valve 24 closed under the action of spring 27.

Supplementary air may thus pass into the low-pressure chamber 17 of the governor via the lines 22, 23, and 16 only if:

(1) One of the lower gears 1 to 3 is engaged, and at the same time, (2) The butterfly valve 11 is placed in the fully opened or nearly opened position.

In the entire fourth gear as well as in the lower control ranges of the first to the third gears, however, the admission of supplementary air to the low-pressure chamber 17 of the governor will be blocked.

The modification of the invention shown in Fig. 5 differs from the embodiment previously described and illustrated by using in place of the electromagnetic control a mechanical control by means of a slide valve 40 which is mounted within the range of the gear shift lever 35 in a position similar to stop 34. The slide 40 is adjustably mounted in the housing 41 and is acted upon by a spring 42 which tends to depress it downwardly so as to connect the channels 43 and 44 through a groove 45 in slide 40. Channel 44 is likewise connected by the lines 22 and 23 to the air nozzle 15, or by the line 16 to the low-pressure chamber of the diaphragm valve 17. The lines 22 and 23, just as in the case of the first embodiment of the invention, are connected by an opening in the shaft 13 of the butterfly valve 12 when the latter is fully open.

Also in this case, supplementary air will thus be supplied to the low-pressure governor via the lines 43, 44, 22, and 23 only if a lower gear range, for example, the first to the third gears, will be engaged and at the same time the engine be adjusted to full load or nearly full load by opening the butterfly valve 12.

If the gears are shifted to the upper range, for example, to the highest gear, the gear shift member corresponding to member 35, will then abut against the plate 46 of the slide valve 40, adjust the same against the action of spring 42, and thereby break the connection between the channels 43 and 44. Consequently in the upper gear shift range, for example, in the fourth gear, supplementary air can no longer pass into the low-pressure governor.

Such mechanical control requires the least possible expense of construction since the withdrawal of the supplementary air from the interior of the car does not involve an expensive air filter but only a thin air line to be connected to the governor line, and only a simple slide valve.

In place of a control by the butterfly valve shaft and a withdrawal of the supplementary air from the atmosphere, the supplementary air may also be taken from the intake pipe of the engine and be controlled, for example, by a slide valve 52, as shown in Figure 6.

In the embodiment according to Figure 6 instead of a direct control by the butterfly valve shaft 13, the shaft 13 is provided with a cam 51 which actuates a slide valve 52, normally urged upwardly by a spring 52', and which is displaced downwardly by the action of the cam 51 in the position indicated in this figure when the butterfly valve 12 is in the open position.

In the position indicated in Figure 6, a transverse bore 53 in the slide valve 52 connects the conduits 54 and 55 with each other. The conduit 54 may be connected with the intake pipe or channel 11 of the engine while the conduit 55 leads to a slide valve 56 which may be actuated by means of an angle lever 57 rotated about its pivot axis by a link member 58 which in turn may be actuated in a manner similar to the link member 33 in Figure 2 and more particularly in such a manner that upon engagement of the fourth gear the link 58 is displaced toward the left as seen in Figure 6 thereby rotating the angle lever clockwise and displacing the slide valve 56 upwardly into the position indicated in the drawing against the force exerted by the biasing spring 59'. The slide valve 56 is provided with a transverse bore 59 which in the position indicated in Figure 6 is displaced in the axial direction of the slide valve 56 with respect to the conduit sections 55 and 60.

The conduit section 60 terminates in an annular channel 61 which in turn is connected with the nozzle 15 and the conduit 16 respectively, similar to that of Figure 2.

The mode of operation of the device shown in Figure 6 is basically the same as that of Figure 2. In the highest gear, the slide valve 56 is displaced upwardly so that the supplementary air can no longer reach the nozzle 15 through the conduit section 60. If, however, the transmission is adjusted to a lower speed, then the valve 56 is displaced downwardly by the action of the spring 59' whereby the supplementary air is permitted to flow into the annular channel 61 through conduct sections 55 and 60 which are in communication with each other by the bore 59 which is in alignment therewith in the lower gears. By the arrival of supplementary air, the vacuum or underpressure is thereby reduced and the fuel control member, such as fuel control member 21, is adjusted to a richer mixture whereas in the higher gear the underpressure or vacuum is increased whereby the fuel control member 21 is adjusted to a leaner mixture thereby also reducing the attainable maximum output of the engine in the highest gear.

As in Figure 2, an adjustment of the throttle valve to the open position is prerequisite for the supplementary air to reach the annular channel 61 via conduit sections 54 and 55 and cross bore 53. However, if the throttle valve 12 is completely or partially closed, then by reason of the shape of the cam 51 the valve 52 is displaced upwardly by the biasing spring 52' and the connection between the conduit sections 54 and 55 over bore 53 interrupted. Consequently, with an adjustment of the engine to a lesser or lower output, the adjustment of the fuel mixture takes place in the usual manner. Since the differential pressure between the intake pipe and the governor line is lower than between the atmosphere and the governor line, the connecting line is preferably given a cross sectional area of correspondingly larger size in order to provide for the desired increase in speed. The slide valve 56 controlling the supplementary air may then be mounted on the engine and be operated, for example, by mechanical or electromagnetic means dependent upon the engagement of the highest or higher gears similar to the showing of Figures 5 or 2. When mounting the slide valve 56 in the interior of the car, for example, on the gear shift lever, it is also possible to provide a direct actuation of the slide valve 56.

The control may also be made of such a construction that the injected fuel quantity, the engine power, or the highest possible speed may be reduced from gear to gear in stages or, in an infinitely variable speed transmission, continuously, such reduction, for example, by a corresponding adjustment of the supply of supplementary air being the greater, the higher the gear in use. Such an arrangement is illustrated in the embodiment according to Figure 7 in which the fuel quantity, the engine power, or the maximum attainable speed is reduced in steps whereby the attainable injected fuel quantity, the engine power, or the maximum possible speed is reduced by a greater amount the higher the gear which is actually engaged.

In the embodiment according to Figure 7, the stepwise reductions in the third and fourth speed or gear are such that in the fourth gear the attainable maximum speed is reduced to a lesser value than in the third speed. For that purpose, the gear shifting lever 62 is connected with a lever arm 63 which acutates a slide valve member 64 which is normally urged upwardly by a spring 65. The slide valve member 64 controls lines 66 and 67 whereby the line 66 corresponds to the line section 55 of Figure 6 and the line 67 to the line section 60 of Figure 6.

The slide valve member 64 is provided with a bore which is arranged therein in such a manner that in the fourth speed the communication or connection between lines 66 and 67 is completely interrupted, in a third speed a throttled connection is established, and in the second and first speeds the connection is rendered completely free or unthrottled whereby the slide valve member 64 after a total movement indicated by $a$ in the drawing abuts against a stop or abutment disk 69.

Consequently, in the operation of this embodiment the supplementary air is completely blocked in the fourth gear, in a third gear supplementary air is added to the control air ordinarily obtained through nozzle 15 by means of a throttle connection, while in the second and first speed the supplementary air is freely added without any throttling. Otherwise, the operation is the same as that of the embodiment according to Figure 2. Furthermore, a device as shown in Figure 8, may be provided which, in an apparaus as shown, for example, in Fig. 2, consists of a supplementary switch 70 or the like which may be closed manually by means of link 71 and be connected in parallel with the switch 31 by means of conductor 72 so as to prevent the valve 24 from closing and thereby prevent the relative reduction of the injected fuel quantity from $b_2$ to $b_3$, the power output or the highest possible engine speed by the operation of the gear shift lever 35. In other words, if the switch 70 is closed then current is conducted, in all cases, over line 72 and conductor 30 to the electromagnet 26 whereby the valve 24 is attracted downwardly and supplementary air is admitted into line 16 over conduit 23. In the embodiment of the invention shown in Fig. 5, a valve such as a three-way valve 72 illustrated in Figure 9 which may open toward the outside through channel 74 and be adjustable by hand or otherwise, may be provided in the line 22, 23, 16 or at any other suitable point. If the valve 72 is adjusted by means of hand lever 73 into the position 73', then the line or conduit 22 is connected with the atmosphere or outside through channel 74. However, in order that line 23 also be connected with the atmosphere in that case, it is a prerequisite that the throttle valve 12 be in the open position so as to ring the bore 25 in the shaft 13 into alignment with the lines 22 and 23.

While Figure 9 has shown the arrangement of the valve 72 in the line 22, it is only necessary to arrange such a valve in the line 23 to render the connection with the outside through channel 74 independent of the position of the bore 25 of the throttle valve shaft 13, i. e., of the position of the butterfly valve 12. Similarly, if the valve 72 is located in the line 16, its operation would be independent of both the shaft 13 and the valve member 24.

If the adjustment is produced by a centrifugal governor, the fuel quantity injected or the maximum power output or maximum speed of the engine obtainable may be reduced by adjusting the spring tension of the governor, which may act, for example, upon the control member regulating the amount of injected fuel, through the action of a slide valve which is operated by the gear shift lever and adjusts the position of the piston of a hydraulic servomotor.

Figure 10:
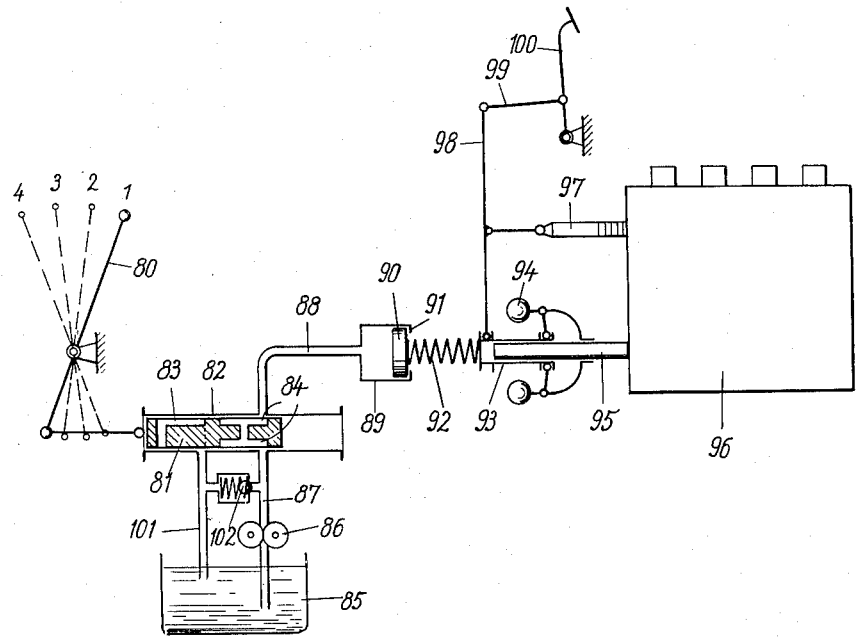
Figure 10 is still another embodiment of a control arrangement in accordance with the present invention in which the fuel adjustment is obtained by a centrifugal governor and in which a servomotor is used to effect the control adjustment from the gearshift lever.

Figure 10 illustrates a practical embodiment to provide a control arrangement as mentioned in the last paragraph, in which the various elements are illustrated more or less schematically. Reference numeral 80 designates a shifting lever for the transmission, similar to the shifting lever 35 illustrated in Figure 2. A slide valve member 81 is actuated or displaced by the gearshifting lever 80. The slide valve member 81 is slidably supported in a sleeve 82 and is provided with control channels or grooves 83 as well as 84, 84' and 84". The control channel 83 is essentially L-shaped while the two control grooves 84 and 84' are interconnected by a smaller bore 84". The control grooves 84, 84' and 84" establish a communication between line 87 and line 88. A pump 86 supplies a hydraulic medium from the reservoir 85 into the line 87 and through control grooves 84, 84' and 84" and through line 88 into a cylinder 89 of the servo-system.

A piston 90 is slidably located within the cylinder 80. The piston 90 may be moved toward the right against the stop or abutment 91 by the presence of a hydraulic medium in the cylinder 89 and, on the other hand, is under the influence of spring 92 which constantly seeks to displace the piston 90 toward the left. The right end of the spring 92 abuts against a sleeve 93 which may be adjusted in the axial direction thereof by a speed governor 94 against the spring force of the spring 92 when the flyweights of the governor 94 are moved outwardly due to increase in the speed of rotation thereof. The governor 94 is thereby arranged on a shaft 95 of the engine or of the fuel pump 96. The regulating member 97 which serves for purposes of adjusting the fuel quantity, for example, a toothed rack 97 is connected by means of a lever-like arm 98, on the one hand, with the control sleeve 93 and, on the other, with a linkage 99 which is adjustable by the pedal 100, such as the accelerator pedal controlled by the driver of the vehicle.

Furthermore, a return line 101 is provided in the servo-system of Figure 10, which in the right hand end position of the slide valve member 81 connects the line 88 over the control groove 83 with the reservoir 85. An excess pressure or relief valve 102 further serves to conduct the excess amount of hydraulic medium supplied by the pump 86 into the return line 101.

The operation of the arrangement illustrated in Figure 10 is as follows:

In the lower speed, such as speeds 1, 2 and 3, the supplied hydraulic medium for the servo-system may reach the pressure space 89 from the reservoir 85 over pump 86, control grooves 84, 84' and 84'' and line 88. As a result thereof, the piston 90 is displaced toward the right up to the abutment 91 so that the spring 92 is under relatively great compression. The centrifugal governor 94 will therefore adjust the control rack 97 to a lower fuel quantity only with a relatively high rotational speed of the shaft 95.

If, however, the fourth speed is engaged, then the line 88 is connected with the return line 101 over the control channel 83 so that the space 89 of the cylinder for the control piston 90 is relieved of pressure. As a result thereof, the piston 90 will therefore always adjust itself into the left end position and thereby relieve the tension of spring 92; thus, the centrifugal governor 94 will reduce the fuel quantity with a relatively slower rotational speed and, therefore, will not permit the engine to reach the same rotational speed or output as in the case of the lower three speeds.

While the foregoing description sets forth in detail what we regard as the preferred embodiments of our invention it is to be understood that numerous changes may be made therein without departing from the spirit and scope of the invention as defined in the appended claims.

Having thus described our invention, what we claim as new is:

1. Apparatus for controlling a fuel injection engine having a gear transmission, comprising an operating member for variably adjusting the power output of the engine, a control member for controlling the fuel quantity injected into said engine, adjusting means controlled by said operating member for adjusting said control member, a gear shift mechanism for operating said gear transmission, means operated by said gear shift mechanism to adjust said fuel control member to a position thereof enabling the injection of a predetermined large quantity of fuel into the engine upon engagement of a lower gear of said transmission and to adjust said fuel control member to a position thereof admitting the injection of a fuel quantity smaller than said first-mentioned quantity upon engagement of a higher gear, and means controlling said first-mentioned adjusting means in accordance with the position of said operating member to enable adjustment of said fuel control member to a position corresponding to said large fuel quantity only upon adjustment of said operating member to a position corresponding to a higher power output of the engine and to prevent said adjustment of said fuel control member upon adjustment of said operating member to a smaller power output.

2. Apparatus for controlling a fuel injection engine having a gear transmission, comprising an air-intake channel, a throttle member within said channel, a control member for controlling the fuel quantity injected into said engine, a pressure-responsive member for adjusting said fuel control member, a conduit connecting said air-intake channel with said pressure-responsive member, a supplementary-air conduit terminating into said first-mentioned conduit, a gear shift mechanism for operating said gear transmission, a control member actuated by said gear shift mechanism for controlling said supplementary-air conduit, said last-mentioned control member being operative to control the supply of supplementary air flowing through said supplementary-air conduit to said first-mentioned conduit to thereby adjust said fuel control member to a relatively larger fuel quantity upon engagement of a lower gear than upon engagement of a higher gear, means for adjusting said throttle member, and means within said last-mentioned means for controlling said supplementary-air conduit in addition to the controlling action of said second-mentioned control member to admit supplementary air to said first-mentioned conduit only upon adjustment of said throttle member to slightly throttle said air-intake channel and to block the supply of supplementary air from said first-mentioned conduit upon adjustment of said throttle member to throttle said intake channel considerably.

3. Apparatus for controlling a fuel injection engine having a gear transmission, comprising an air-intake channel, a throttle member within said channel, a control member for controlling the fuel quantity injected into said engine, a pressure-responsive member for adjusting said fuel control member, a conduit connecting said air-intake channel with said pressure-responsive member, a supplementary-air conduit terminating into said first-mentioned conduit, a gear shift mechanism for operating said gear transmission, a control member adjusted by said gear shift mechanism for controlling said supplementary air conduit, said last-mentioned member being operative to control the supply of supplementary air through said supplementary-air conduit to said first-mentioned conduit to thereby adjust said fuel control member to a relatively larger fuel quantity upon engagement of a lower gear than upon engagement of a higher gear, means for controlling said supplementary-air conduit depending on the position of said throttle member to enable adjustment of said fuel control member to admit said larger fuel quantity only upon adjustment of said throttle member to a position corresponding to a higher power output of said engine and to prevent said adjustment of said fuel control member upon adjustment of said throttle member to a position corresponding to a smaller engine output.

4. Apparatus for controlling a fuel injection engine having a gear transmission, comprising an air-intake channel, a throttle member within said channel, a control member for controlling the fuel quantity injected into said engine, a pressure-responsive member for adjusting said fuel control member, a conduit connecting said air-intake channel with said pressure-responsive member, a supplementary-air conduit terminating into said first-mentioned conduit, a gear shift mechanism for operating said gear transmission, a control member adapted to be adjusted by said gear shift mechanism for controlling said supplementary-air conduit, said last-mentioned control member being operative to control the supply of supplementary air flowing through said supplementary-air conduit to said first-mentioned conduit to thereby adjust said fuel control member to a relatively larger fuel quantity upon engagement of a lower gear than upon engagement of a higher gear, means for adjusting said second-mentioned control member by the operation of said gear shift mechanism including an electromagnet operatively connected with said second-mentioned control member, and a circuit controlled by said gear shift mechanism for operating said electromagnet.

5. An apparatus according to claim 4, wherein said second control member forms a shut-off element for blocking the supplementary-air current, and wherein said circuit is controlled by said gear shift mechanism to close that circuit upon engagement of a lower gear to thereby open said supplementary-air conduit by said second control member, and to open said circuit upon engagement of a higher gear to thereby shut off said supplementary-air conduit by said second-mentioned control member.

6. An apparatus according to claim 1, wherein said last-mentioned means includes a valve member, and mechanical means connecting said gear shift mechanism with said valve member to operate the latter.

7. Apparatus for controlling a fuel injection engine having a gear transmission comprising control means for controlling the fuel quantity to be injected into the engine, a gear shift mechanism, and means actuated by said gear-shift mechanism and operatively connected with said control means to adjust said control means upon engagement of one of the gears of said transmission to provide a relatively rapid decrease in the fuel quantity when the engine speed exceeds a predetermined speed and to provide a relatively slower decrease upon engagement of a lower gear so as to obain a lower mximum speed in the first case than in the second case under otherwise the same conditions.

8. Apparatus for controlling a fuel injection engine having a gear transmission comprising control means for controlling the fuel quantity to be injected into the engine by the underpressure in the intake manifold of the engine, actuating means for actuating said gear transmission, and means actuated by said actuating means and operatively connected with said control means to add supplementary air to the underpressure air used for controlling the fuel quantity upon engagement of a lower gear to thereby reduce the underpressure and therewith increase the injected fuel quantity including means for preventing the use of the supply of said supplementary air upon engagement of a higher gear for controlling the fuel quantity to thereby prevent a relative increase of the fuel quantity.

9. Apparatus for controlling a fuel injection engine having a multi-speed transmission comprising control means for controlling the fuel quantity to be injected into the engine, actuating means for actuating the various speeds of said transmission, and means actuated by said actuating means and operatively connected with said control means for additionally controlling said control means to increase the injected fuel quantity upon engagement only of a lower speed of said transmission by said actuating means and to effectively disable said third-mentioned means upon engagement of a higher speed of said engine by said actuating means.

10. The apparatus according to claim 9, further comprising means for rendering said third-mentioned means effective upon adjustment of said engine to produce an engine output in excess of a predetermined amount.

References Cited in the file of this patent
UNITED STATES PATENTS

| | | |
|---|---|---|
| 2,600,983 | Fell et al. | June 17, 1952 |
| 2,612,965 | Christie | Oct. 7, 1952 |
| 2,680,381 | Maybach | June 8, 1954 |
| 2,688,259 | Maybach et al. | Sept. 8, 1954 |

UNITED STATES PATENT OFFICE

CERTIFICATE OF CORRECTION

Patent No. 2,842,980                                                       July 15, 1958

Friedrich K. H. Nallinger et al.

It is hereby certified that error appears in the printed specification of the above numbered patent requiring correction and that the said Letters Patent should read as corrected below.

Column 2, line 27, for "himilar" read -- similar --; line 31, for "central" read -- control --; column 3, line 68, for "valve 11" read -- valve 12 --; column 4, line 10, after "chamber" insert the reference numeral "17"; same line 10, for "valve 17" read -- valve 18 --; column 6, line 27, for "ring" read -- bring --.

Signed and sealed this 8th day of March 1960.

(SEAL)
Attest:

KARL H. AXLINE                                              ROBERT C. WATSON

Attesting Officer                                           Commissioner of Patents